United States Patent
Oshiro et al.

(10) Patent No.: US 6,917,864 B2
(45) Date of Patent: Jul. 12, 2005

(54) METHOD AND APPARATUS FOR DETECTING DECREASE IN TIRE AIR-PRESSURE, AND PROGRAM FOR JUDGING DECOMPRESSION OF TIRE

(75) Inventors: Yuji Oshiro, Kobe (JP); Masashi Kitano, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/426,620

(22) Filed: May 1, 2003

(65) Prior Publication Data

US 2003/0210136 A1 Nov. 13, 2003

(30) Foreign Application Priority Data

May 10, 2002 (JP) ........................................ 2002-135517

(51) Int. Cl.[7] ................................................ G06F 7/00
(52) U.S. Cl. ........................... 701/29; 701/36; 340/442; 340/443; 340/444
(58) Field of Search ............................... 701/1, 29, 36, 701/93, 91; 340/492, 444, 443; 73/146.2, 146.5

(56) References Cited

U.S. PATENT DOCUMENTS

| | | | |
|---|---|---|---|
| 5,561,415 A | | 10/1996 | Dieckmann |
| 5,747,686 A | * | 5/1998 | Nishihara et al. ........... 340/444 |
| 5,826,210 A | * | 10/1998 | Izumi et al. ................ 340/444 |
| 5,866,812 A | * | 2/1999 | Nishihara et al. ............... 79/79 |
| 5,907,097 A | * | 5/1999 | Nakajima et al. ........... 340/444 |
| 5,936,519 A | * | 8/1999 | Nakajima et al. ........... 340/444 |
| 6,529,851 B1 | * | 3/2003 | Oshiro ........................ 701/29 |
| 6,622,074 B1 | * | 9/2003 | Coelingh et al. ............... 701/1 |

FOREIGN PATENT DOCUMENTS

| | | |
|---|---|---|
| EP | 0 768 193 A1 | 4/1997 |
| JP | 63-305011 | 12/1988 |
| JP | 7-47820 | 2/1995 |
| JP | 7-52621 | 2/1995 |
| JP | 10-206460 | 8/1998 |

* cited by examiner

*Primary Examiner*—Richard M. Camby
(74) *Attorney, Agent, or Firm*—Birch, Stewart, Kolasch & Birch, LLP

(57) ABSTRACT

A method for detecting decrease in tire air-pressure in which decrease in internal pressure of a tire is detected on the basis of rotational information obtained from tires attached to a vehicle. The method includes the steps of: detecting rotational information of the respective tires; storing the rotational information of the respective tires; obtaining a slip rate between the tires and a road surface during running; comparing the slip rate with a slip rate which has been preliminarily obtained when at normal internal pressure; and judging simultaneous decompression of two wheel tires of both front wheels or simultaneous decompression of two wheel tires of both rear wheels on the basis of a relationship between a value obtained through comparison of the two slip rates and a specified threshold. It is possible to judge simultaneous decompression of two wheel tires of both front wheels or wheel two tires of both rear wheels.

9 Claims, 3 Drawing Sheets

METHOD AND APPARATUS FOR DETECTING DECREASE IN TIRE AIR-PRESSURE, AND PROGRAM FOR JUDGING DECOMPRESSION OF TIRE

BACKGROUND OF THE INVENTION

The present invention relates to a method and apparatus for detecting decrease in tire air-pressure, and a program for judging decompression of a tire. More particularly, it relates to a method and apparatus for detecting decrease in tire air-pressure, and a program for judging decompression of a tire with which it is possible to detect simultaneous decompression of two wheel tires of both front wheels or rear wheels.

An apparatus for detecting decrease in tire air-pressure (DWS) in which decompression of a tire is detected on the basis of rotational (wheel speed) information of four wheel tires attached to a vehicle is conventionally known. Such an apparatus employs a theory that a rotational velocity or a rotational angular velocity of a compressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires (reference should be made to Japanese Unexamined Patent Publication No. 305011/1988), $$DEL=\{(F1+F4)/2-(F2+F3)/2\}/\{(F1+F2+F3+F4)/4\}\times 100(\%)$$

is employed as a judged value DEL. Here, F1 to F4 denote rotational angular velocities of a front left tire, a front right tire, a rear left tire and a rear right tire, respectively.

Since the tires are manufactured to include variations (initial differences) within standards, effective rolling radii of the respective tires are not necessarily identical even though all of the tires are at normal internal pressure. This will result in variations in the rotational angular velocities of the respective tires. To cope with this point, there is suggested a technique in, for instance, Japanese Unexamined Patent Publication No. 206460/1998, in which initial correction coefficients for eliminating differences in effective rolling radii affecting rotational angular velocities are obtained whereupon the velocities of the respective tires are corrected by using such initial correction coefficients so as to perform judgment of decompression of tires on the basis of the judged values DEL.

However, since decompression is judged on the basis of a difference in sums of rotational angular velocities of the four wheels which are respectively located diagonally with respect to each other, it is impossible to simultaneously detect decompression of both front wheels or both rear wheels. It therefore exists the danger that fuel consumption is worsened through increase in rolling resistance of the tire and that a burst might be caused upon continuing running without being aware of decompression.

SUMMARY OF THE INVENTION

In view of the above facts, it is an object of the present invention to provide a method and apparatus for detecting decrease in tire air-pressure, and a program for judging decompression of a tire with which it is possible to detect simultaneous decompression of both front wheel tires or both rear wheel tires.

In accordance with a first aspect of the present invention, there is provided a method for detecting decrease in tire air-pressure in which decrease in internal pressure of a tire is detected on the basis of rotational information obtained from tires attached to a vehicle. The method includes the steps of: detecting rotational information of the respective tires; storing the rotational information of the respective tires; obtaining a slip rate between the tires and a road surface during running; comparing the slip rate with a slip rate which has been preliminarily obtained when at normal internal pressure; and judging simultaneous decompression of two wheel tires of both front wheels or simultaneous decompression of two wheel tires of both rear wheels on the basis of a relationship between a value obtained through comparison of the two slip rates and a specified threshold.

In accordance with a second aspect of the present invention, there is provided an apparatus for detecting decrease in tire air-pressure in which decrease in internal pressure of a tire is detected on the basis of rotational information obtained from tires attached to a vehicle. The apparatus includes: rotational information detecting means which detect rotational information of the respective tires; a rotational information storing means which stores the rotational information of the respective tires; a slip rate calculating means which obtains a slip rate between the tires and a road surface during running; a slip rate comparing means which compares the slip rate with a slip rate which has been preliminarily obtained when at normal internal pressure; and a decompression judging means which judges simultaneous decompression of two wheel tires of both front wheels or simultaneous decompression of two wheel tires of both rear wheels on the basis of a relationship between a value obtained through comparison of the two slip rates and a specified threshold.

In accordance with a third aspect of the present invention, there is provided a program for judging decompression of a tire, in which for judging decrease in tire air-pressure of a tire, a computer is made to function as a rotational information storing means which stores the rotational information of the respective tires; a slip rate calculating means which obtains a slip rate between the tires and a road surface during running; a slip rate comparing means which compares the slip rate with a slip rate which has been preliminarily obtained when at normal internal pressure; and a decompression judging means which judges simultaneous decompression of two wheel tires of both front wheels or simultaneous decompression of two wheel tires of both rear wheels on the basis of a relationship between a value obtained through comparison of the two slip rates and a specified threshold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The method and apparatus for detecting decrease in tire air-pressure, and the program for judging decompression of a tire according to the present invention will now be explained on the basis of the accompanying drawings.

Figure 1:
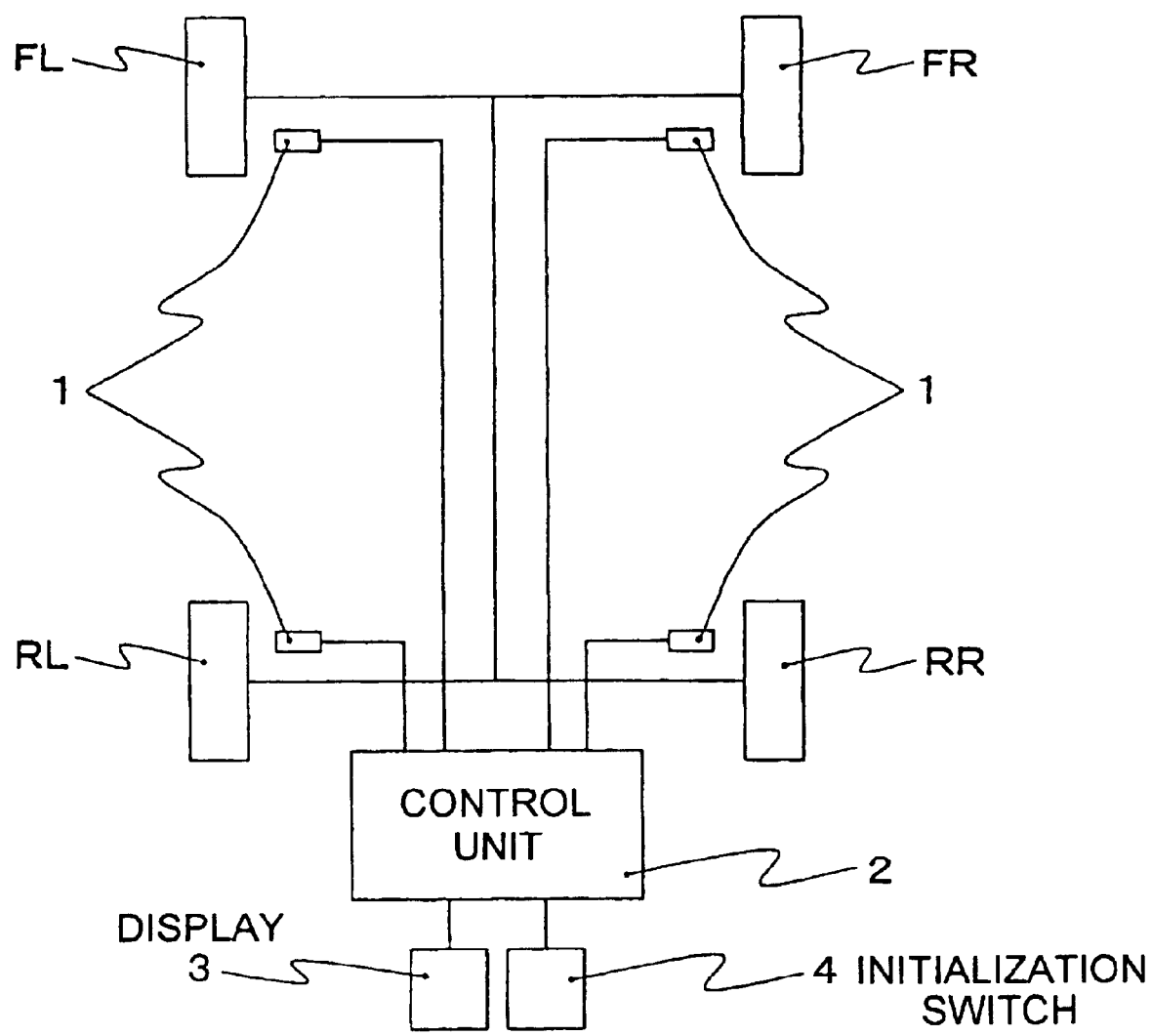
FIG. 1 is a block diagram illustrating one embodiment of the apparatus for detecting decrease in tire air-pressure according to the present invention.

As illustrated in FIG. 1, the apparatus for detecting decrease in tire air-pressure according to one embodiment of the present invention is for detecting whether air-pressure of any of four tires FL, FR, RL and RR (hereinafter referred to as Wi in general, wherein i=1to 4, 1: front left tire, 2: front right tire, 3: rear left tire, 4: rear right tire) attached to a four-wheeled vehicle has decreased or not, and includes ordinary rotational information detecting means 1 which are provided in relation to the respective tires Wi.

The rotational information detecting means 1 might be a wheel speed sensor for measuring a wheel speed (rotational velocity) on the basis of number of pulses upon generating rotational pulses by using an electromagnetic pickup or similar or an angular velocity sensor in which power is generated through rotation such as in a dynamo, wherein the wheel speed is measured from a voltage thereof. Outputs of the rotational information detecting means 1 are supplied to a control unit 2 which might be a computer such as an ABS. A display 3 comprising liquid crystal display elements, plasma display elements or CRT for informing a tire Wi of which the tire air-pressure has decreased and an initialization switch 4 which might be operated by a driver are connected to the control unit 2.

Figure 2:
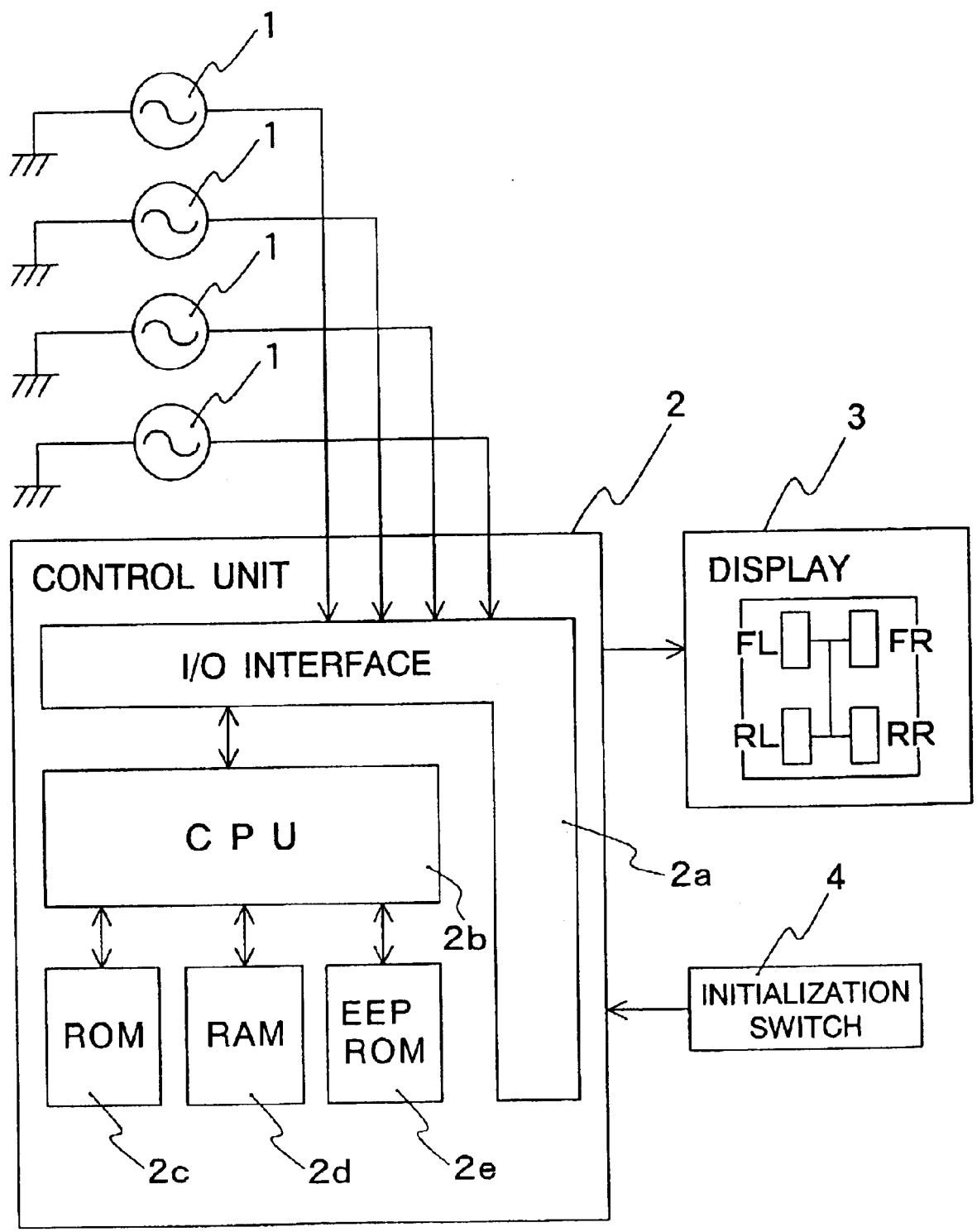
FIG. 2 is a block diagram illustrating electric arrangements of the apparatus for detecting decrease in tire air-pressure of FIG. 1.

As illustrated in FIG. 2, the control unit 2 comprises an I/O interface 2a required for receiving/sending signals from/to an external device, a CPU 2b which functions as a center of calculation, a ROM 2c which stores a control operation program for the CPU 2b, a RAM 2d into which data are temporally written and are read out therefrom when the CPU 2b performs control operations, and an EEPROM 2e to which initial study values and updated initial values are written.

Pulse signals corresponding to the rotational number of tires Wi (hereinafter referred to as "wheel speed pulse") are output from the rotational information detecting means 1. In the CPU 2b, rotational angular velocities $F_i$ for the respective tires Wi are calculated on the basis of the wheel speed pulses as output from the rotational information detecting means 1 at specified sampling periods ΔT(sec), for instance, ΔT=1 second.

Since the tires Wi are manufactured to include variations (initial differences) within standards, effective rolling radii of the respective tires Wi (a value obtained by dividing a distance that has been traveled by a single rotation by $2\pi$) are not necessarily identical even though all of the tires Wi are at normal internal pressure. This will result in variations in the rotational angular velocities $F_i$ of the respective tires Wi. Thus, corrected rotational angular velocities $F1_i$ are calculated to cancel variations owing to initial differences. More particularly, corrections are performed to satisfy $F1_1 = F_1$ $F1_2 = mF_2$ $F1_3 = F_3$ $F1_4 = nF_4$ The correction coefficients m and n are obtained as $m = F_1/F_2$ and $n = F_3/F_4$ on the basis of rotational angular velocities $F_i$ where the rotational angular velocities $F_i$ have been calculated on the premise that the vehicle is performing straight-ahead driving. Then, wheel speeds Vi of the respective tires are calculated on the basis of $F1_i$.

While a slip rate obtained when running for a short time (slip rate when the acceleration/deceleration of the vehicle is proximate to zero) is generally employed for judging gradients of road surfaces, an average of the obtained slip rates will be a slip rate as obtained when running on a flat road (wheel speed ratio of front wheels and rear wheels) if the vehicle is running for a long period of time of, for instance, one hour since the vehicle will run both uphill and downhill. When decompression is present, a radius of a decompressed tire becomes smaller whereas the wheel speed becomes larger so that the wheel speed ratio of the front wheels and rear wheels will change from that obtained when at normal air pressure. It is accordingly possible to judge decompression by observing the slip rate.

According to the present embodiment, there are provided rotational information detecting means 1 which detect rotational information of the respective tires Wi; a rotational information storing means which stores the rotational information of the respective tires Wi; a slip rate calculating means which obtains a slip rate between the tires Wi and a road surface during running; a slip rate comparing means which compares the slip rate with a slip rate which has been preliminarily obtained when at normal internal pressure; and a decompression judging means which judges simultaneous decompression of two wheel tires of both front wheels or simultaneous decompression of two wheel tires of both rear wheels on the basis of a relationship between a value obtained through comparison of the two slip rates and a specified threshold.

In the present embodiment, there are also provided an acceleration calculating means which obtains a vehicle acceleration during running, a relation calculating means which obtains a relationship between the vehicle acceleration, which is outside of a specified range in which the vehicle acceleration is proximate to zero, and the slip rate, and an average value calculating means which estimates a slip rate when the vehicle acceleration is zero on the basis of the relationship between the vehicle acceleration and the slip rate and which calculates an average value thereof.

In the program for judging decompression of a tire according to the present embodiment, the control unit 2 is made to function as the rotational information storing means which stores the rotational information of the respective tires Wi; the slip rate calculating means which obtains a slip rate between the tires Wi and a road surface during running; the slip rate comparing means which compares the slip rate with a slip rate that has been preliminarily obtained when at normal internal pressure; and the decompression judging means which judges simultaneous decompression of two wheel tires of both front wheels or simultaneous decompression of two wheel tires of both rear wheels on the basis of a relationship between a value obtained through comparison of the two slip rates and a specified threshold. According to the present embodiment, the control unit 2 is further made to function as the acceleration calculating means which obtains a vehicle acceleration during running, the relation calculating means which obtains a relationship between the vehicle acceleration, which is outside of a specified range in which the vehicle acceleration is proximate to zero, and the slip rate, and the average value calculating means which estimates a slip rate when the vehicle acceleration is zero on the basis of the relationship between the vehicle acceleration and the slip rate and which calculates an average value thereof.

Processes for detecting decrease in tire air-pressure according to the present apparatus for detecting decrease in tire air-pressure are executed by the control unit 2 per each sampling period $\Delta T$ through the operation of the CPU 2b in accordance with a specified program stored in the ROM 2c.

A slip rate between the tires and the road surface is obtained, and when this slip rate differs from a slip rate when at normal internal pressure, it is determined that both tires of either the front wheels or the rear wheels have simultaneously decompressed.

The average value calculating means estimates a slip rate when the vehicle acceleration is zero on the basis of the slip rate and the vehicle acceleration when the vehicle acceleration is outside of a specified range proximate to zero, and determines that both tires of either the front wheels or the rear wheels have simultaneously decompressed.

The slip rate when at normal internal pressure is calculated upon performing running for a specified period of time in a condition where it is known that the tires are at normal internal pressure wherein some values for the slip rate are obtained and averaged when the vehicle acceleration is not proximate to zero (for instance, utilizing data obtained after an hour of running).

The obtained slip rates when at normal internal pressure are stored in the EEPROM such that they are memorized also when the ignition key is switched OFF.

Operations of the apparatus for detecting decrease in tire air-pressure according to the present embodiment will now be explained along with steps (1) to (9).

(1) The wheel speeds ($V1_n$, $V2_n$, $V3_n$, and $V4_n$) are calculated on the basis of the respective rotational velocity of the four wheel tires Wi of the vehicle.

For instance, wheel speed data of the respective wheel tires Wi obtained from a sensor such as an ABS sensor at a certain time point are defined to be wheel speeds $V1_n$, $V2_n$, $V3_n$, and $V4_n$.

(2) The average wheel speeds ($Vf_n$, $Vd_n$) of the following wheels and driving wheels are calculated.

When the vehicle is a front-wheel driving type, average wheel speeds $Vf_n$, $Vd_n$ of the following wheels and the driving wheels at a certain point of time are calculated on the basis of the following equations (1) and (2).

$$Vf_n=(V3_n+V4_n)/2 \quad (1)$$

$$Vd_n=(V1_n+V2_n)/2 \quad (2)$$

(3) The acceleration of the vehicle (that is, average wheel acceleration of the following wheels) $Af_n$ is calculated.

When a wheel speed data preceding the average wheel speed $Vf_n$ of the following wheels by one is defined to be average wheel speed $Vf_{n-1}$, the acceleration $Af_n$ of the vehicle is respectively obtained from the following equation (3).

$$Af_n=(Vf_n-Vf_{n-1})\Delta t/g \quad (3)$$

Here, $\Delta t$ denotes a time interval (sampling time) between wheel speed $Vf_n$ and $Vf_{n-1}$ as calculated from the wheel speed data, and g acceleration of gravity. While the sampling time has been set to be one second in the present embodiment for the purpose of reducing variations in data and performing judgment in a short time, the present invention is not limited to this value.

(4) The slip rate $S_n$ is calculated from the following equation (4) on the basis of a ratio of the average wheel speed $Vd_n$ of the driving wheels to the vehicle speed (average wheel speed $Vf_n$ of the following wheels).

$$S_n=Vd_n/Vf_n \quad (4)$$

(5) When a specified amount, for instance, five pieces of data has been accumulated, it is determined whether any pieces of data are present of which absolute values of the vehicle acceleration are not less than 0.005 G, that is, of which the vehicle acceleration is not proximate to zero.

(6) In the presence of data of which the vehicle acceleration is not proximate to zero, linear regression is performed for the slip rate and the vehicle acceleration so as to estimate a slip rate when the vehicle acceleration is zero.

(7) Upon accumulating a certain amount of slip rates, slip rates when the vehicle acceleration is zero are estimated and an average value thereof is obtained.

(8) Then, a current slip rate in Step (7) is estimated and it is determined whether there is any difference between the average value and the slip rate when at normal internal pressure (whether the difference is outside a specified range or not). It is determined whether, for instance, an absolute value of the difference is not less than a threshold 0.002. It should be noted that a comparison value other than a difference might be a comparison value expressed as a ratio.

(9) When the difference, which represents the comparison value, is larger than the threshold, simultaneous decompression of two wheel tires of both front wheels or simultaneous decompression of two wheel tires of both rear wheels is judged.

While the present invention will now be explained on the basis of an example thereof, the present invention is not to be limited to such an example only.

EXAMPLE

An FF (front engine/front drive) vehicle equipped with tires of normal air-pressure ($2.2\times10^5$ Pa) was prepared. The tire size of the tires was 215/50R17. Running conditions for the vehicle were such that running was performed on a public road for approximately one hour with two crewmen riding thereon.

The wheel speeds of four wheels were sampled during running. The sampling time for the wheel speeds of the wheels was set to be one second in order to obtain a large number of pieces of data while eliminating variations and measuring errors.

Figure 3:
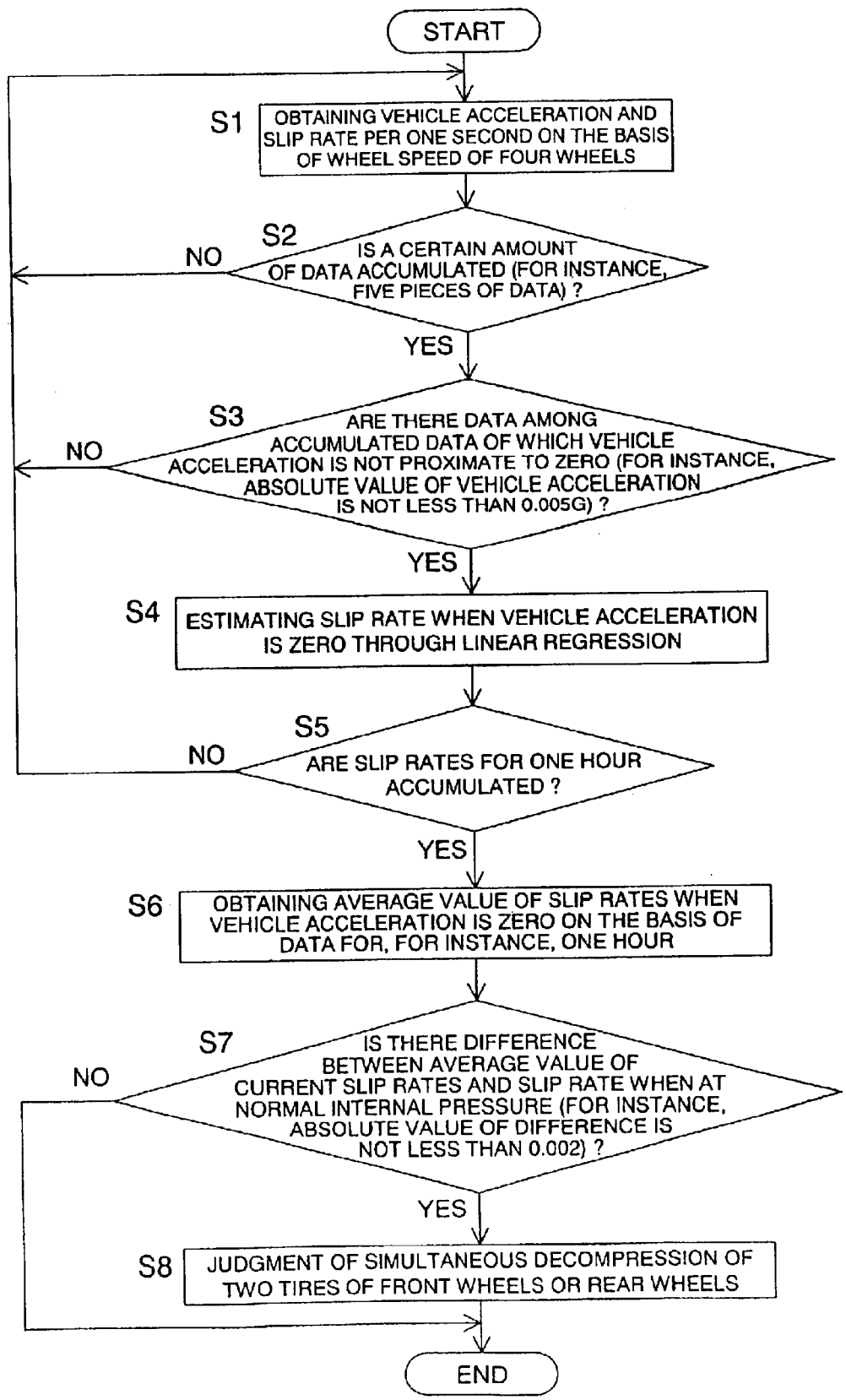
FIG. 3 is one example of a flowchart of the present invention.

As illustrated in FIG. 3, the average wheel speed of the following wheels was defined to be the vehicle velocity, the vehicle acceleration was obtained by differentiating the vehicle velocity by the sampling time, and the slip rate was obtained on the basis of the wheel speed (Step S1).

It was then determined whether five pieces of data have been accumulated or not (Step S2). When YES, it was determined whether there were pieces of data among these of which the vehicle acceleration was not proximate to zero, for instance, of which the absolute value of the vehicle acceleration was not less than 0.005 G (Step S3).

The slip rate when the vehicle acceleration was zero was then estimated through linear regression for data of which the absolute value of the vehicle acceleration was not less than 0.005 G (Step S4). When estimated slip rates were accumulated for, for instance, one hour, an average value of the slip rates when the vehicle acceleration was zero was obtained (Steps S5 and S6).

In the above steps, the preliminarily obtained slip rate when at normal internal pressure was 1.001. The current slip rate was estimated on the basis of data obtained upon decompressing the air-pressure of two tires of both front wheels by 30% wherein the vehicle was made to run on a public road for approximately one hour, and the average value thereof, 1.0035, was obtained.

It was then determined whether a difference between the average value of the current slip rates and the value of the slip rate when at normal internal pressure was outside the specified range of ±0.002 or not, or it was determined whether the absolute value of the difference was not less than 0.002 or not (Step S7). Since it was determined that it is outside of the specified range (the absolute value of a difference between two slip rates 0.0025 (11.0035−1.0011) is not less than the specified threshold 0.002), it could be judged that two wheel tires of both front wheels were simultaneously decompressed (Step S8).

As explained so far, according to the present invention, even if the vehicle acceleration is not proximate to zero, the slip rate between the tires and the road surface and the slip rate when at normal internal pressure is compared and when the comparison value exceeds a threshold, it is possible to judge simultaneous decompression of two wheel tires of both front wheels or two wheel tires of both rear wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for detecting decrease in tire air-pressure in which decrease in internal pressure of a tire is detected on the basis of rotational information obtained from tires attached to a vehicle, comprising the steps of:

detecting rotational information of the respective tires;

storing the rotational information of the respective tires;

obtaining a slip rate between the tires and a road surface during running;

comparing the slip rate with a slip rate which has been preliminarily obtained when at normal internal pressure; and judging simultaneous decompression of two wheel tires of both front wheels or simultaneous decompression of two wheel tires of both rear wheels on the basis of a relationship between a value obtained through comparison of the two slip rates and a specified threshold, and wherein said step of judging simultaneous decompression is performed on the basis of only a relationship between a value obtained through comparison of the two slip rates and a specified threshold.

2. The method of claim 1, wherein the method further comprises the steps of:

obtaining a vehicle acceleration during running;

obtaining a relationship between the vehicle acceleration, which is outside of a specified range in which the vehicle acceleration is proximate to zero, and the slip rate; and estimating a slip rate when the vehicle acceleration is zero on the basis of the relationship between the vehicle acceleration and the slip rate to calculate an average value thereof.

3. An apparatus for detecting decrease in tire air-pressure in which decrease in internal pressure of a tire is detected on the basis of rotational information obtained from tires attached to a vehicle, comprising:

rotational information detecting means which detect rotational information of the respective tires;

a rotational information storing which that stores the rotational information of the respective tires;

a slip rate calculating means which obtains a slip rate between the tires and a road surface during running;

a slip rate comparing means which compares the slip rate with a slip rate which has been preliminarily obtained when at normal internal pressure; and a decompression judging means which judges simultaneous decompression of two wheel tires of both front wheels or simultaneous decompression of two wheel tires of both rear wheels on the basis of a relationship between a value obtained through comparison of the two slip rates and a specified threshold, and wherein said decompression judging means judges simultaneous decompression on the basis of only a relationship between a value obtained through comparison of the two slip rates and a specified threshold.

4. The apparatus of claim 3, wherein the apparatus further includes an acceleration calculating means which obtains a vehicle acceleration during running, a relation calculating means which obtains a relationship between the vehicle acceleration, which is outside of a specified range in which the vehicle acceleration is proximate to zero, and the slip rate, and an average value calculating means which estimates a slip rate when the vehicle acceleration is zero on the basis of the relationship between the vehicle acceleration and the slip rate and which calculates an average value thereof.

5. A program for judging decompression of a tire, in which for judging decrease in tire air-pressure of a tire, a computer is made to function as:

a rotational information storing means which stores the rotational information of the respective tires;

a slip rate calculating means which obtains a slip rate between the tires and a road surface during running;

a slip rate comparing means which compares the slip rate with a slip rate which has been preliminarily obtained when at normal internal pressure; and a decompression judging means which judges simultaneous decompression of two wheel tires of both front wheels or simultaneous decompression of two wheel tires of both rear wheels on the basis of a relationship between a value obtained through comparison of the two slip rates and a specified threshold, and wherein said decompression judging means judges simultaneous decompression on the basis of only a relationship between a value obtained through comparison of the two slip rates and a specified threshold.

6. The method according to claim 1, wherein said step of obtaining a slip rate calculates the slip rate from a ratio of an average wheel speed of right and left driving wheels and an average wheel speed of right and left following wheels.

7. The apparatus according to claim 3, wherein said slip rate calculating means calculates the slip rate from a ratio of an average wheel speed of right and left driving wheels and an average wheel speed of right and left following wheels.

8. The program according to claim 5, wherein said slip rate calculating means calculates the slip rate from a ratio of an average wheel speed of right and left driving wheels and an average wheel speed of right and left following wheels.

9. The program of claim 5, wherein the computer is further made to function as an acceleration calculating means which obtains a vehicle acceleration during running, a relation calculating means which obtains a relationship between the vehicle acceleration, which is outside of a specified range in which the vehicle acceleration is proximate to zero, and the slip rate, and an average value calculating means which estimates a slip rate when the vehicle acceleration is zero on the basis of the relationship between the vehicle acceleration and the slip rate and which calculates an average value thereof.

* * * * *